United States Patent
Oppermann et al.

(10) Patent No.: US 11,726,263 B2
(45) Date of Patent: Aug. 15, 2023

(54) OPTICAL SYSTEM, OPTICAL COMPONENTS, AND METHOD FOR MANUFACTURING AN OPTICAL SYSTEM

(71) Applicant: Fraunhofer-Gesellschaft zur Förderung der angewandten Forschung e.V., Munich (DE)

(72) Inventors: Hans-Hermann Oppermann, Berlin (DE); Tolga Tekin, Berlin (DE); Charles-Alix Manier, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 85 days.

(21) Appl. No.: 16/947,100

(22) Filed: Jul. 17, 2020

(65) Prior Publication Data
US 2021/0018687 A1    Jan. 21, 2021

(30) Foreign Application Priority Data
Jul. 19, 2019    (DE) .................... 10 2019 210 747.8

(51) Int. Cl.
*G02B 6/26*    (2006.01)
*G02B 6/42*    (2006.01)

(52) U.S. Cl.
CPC ............. *G02B 6/26* (2013.01); *G02B 6/4224* (2013.01)

(58) Field of Classification Search
CPC .................................................. G02B 6/4224
See application file for complete search history.

(56) References Cited

U.S. PATENT DOCUMENTS

| 5,042,709 A * | 8/1991 | Cina | H01L 21/681 228/49.1 |
| 6,195,478 B1 * | 2/2001 | Fouquet | G02B 6/3514 385/16 |

(Continued)

FOREIGN PATENT DOCUMENTS

DE    102016203453    9/2017

OTHER PUBLICATIONS

"Chinese Application Serial No. 202010701730.X, Office Action dated Apr. 15, 2023", w English Translation, (Apr. 15, 2023), 14 pgs.

*Primary Examiner* — Eric Wong
(74) *Attorney, Agent, or Firm* — Schwegman Lundberg & Woessner, P.A.

(57) ABSTRACT

Disclosed herein is an optical system, comprising a first optical component, featuring a first waveguide and a recess which passes at least partially through the first optical component from a front side to a back side, a second optical component, arranged in the recess of the first optical component, and a second waveguide optically coupled with the first waveguide, and a carrier substrate. The first optical component including a first marking set with a defined position/orientation relative to the first waveguide, the second optical component including a second marking set with a defined position/orientation relative to the second waveguide, and based on a relative position/orientation of the first and second marking sets, determine whether the first and the second optical components are aligned in a reference plane that is parallel to a surface of the carrier substrate, such that the first and the second waveguide are optically coupled.

16 Claims, 13 Drawing Sheets

(56) References Cited

U.S. PATENT DOCUMENTS

| | | | |
|---|---|---|---|
| 2003/0152328 A1* | 8/2003 | Trott | G02B 6/4224 385/49 |
| 2006/0088246 A1* | 4/2006 | Han | G02B 6/122 385/47 |
| 2011/0164849 A1 | 7/2011 | Rogers et al. | |
| 2020/0132934 A1* | 4/2020 | Sutherland | G02B 6/3684 |

* cited by examiner

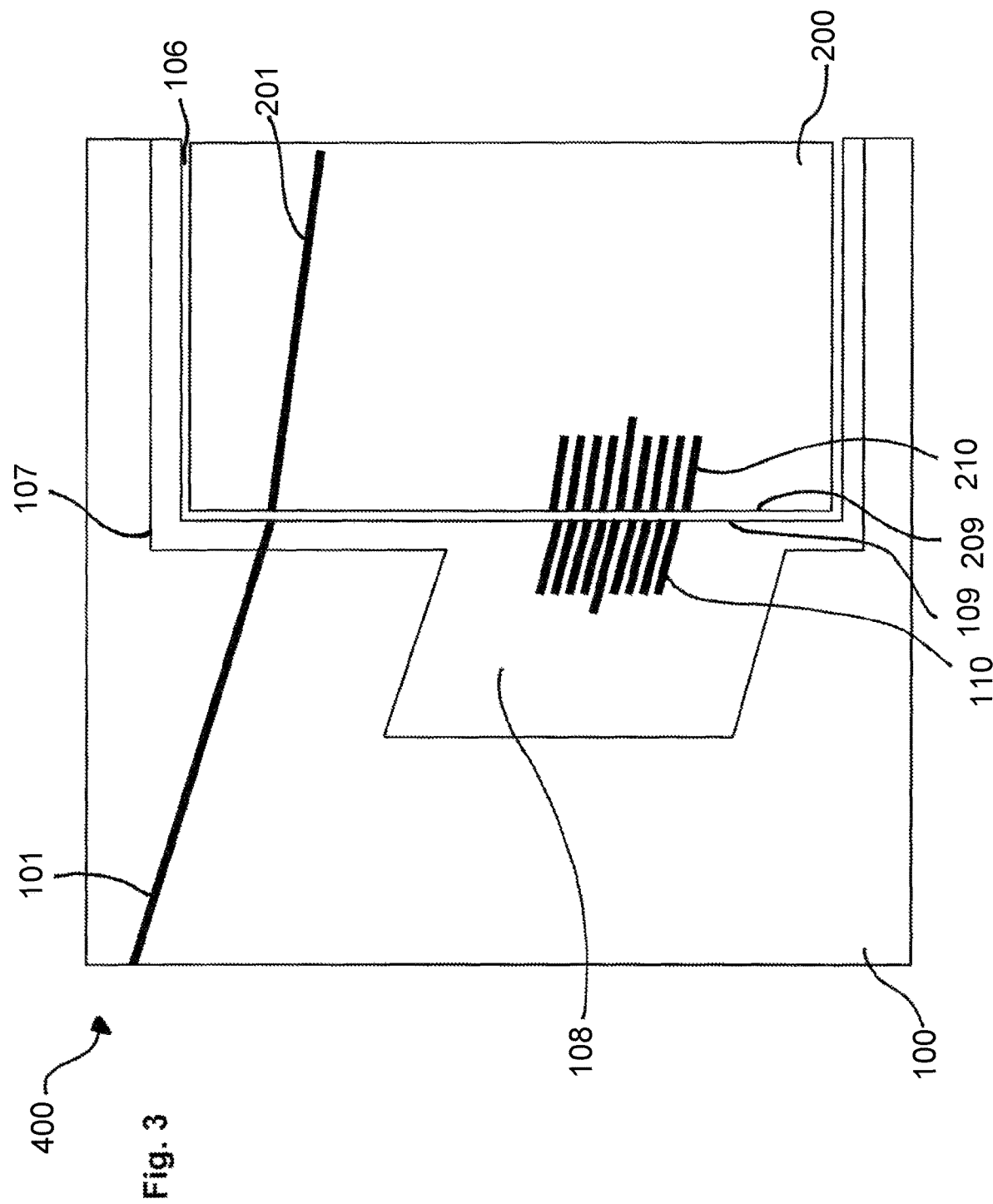

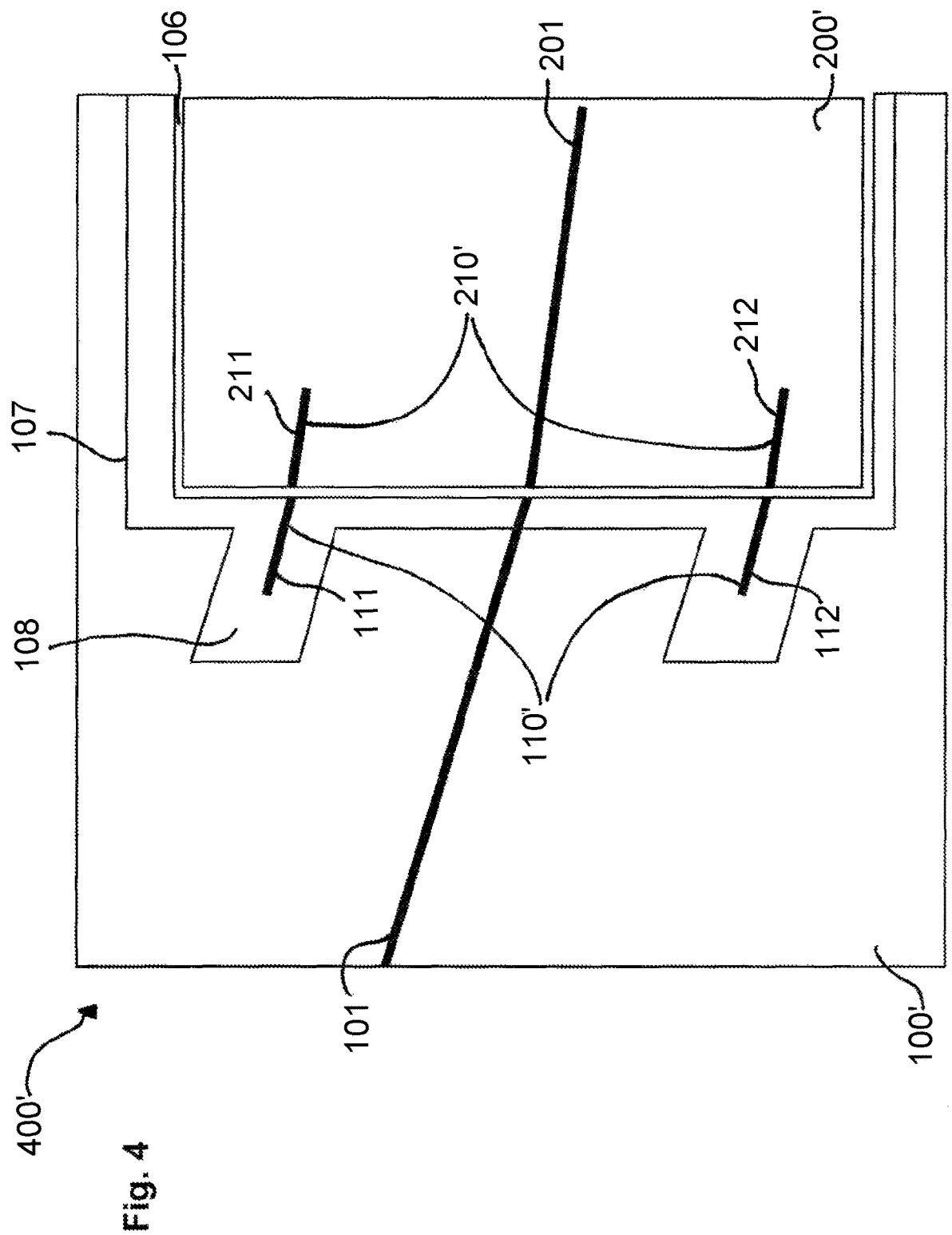

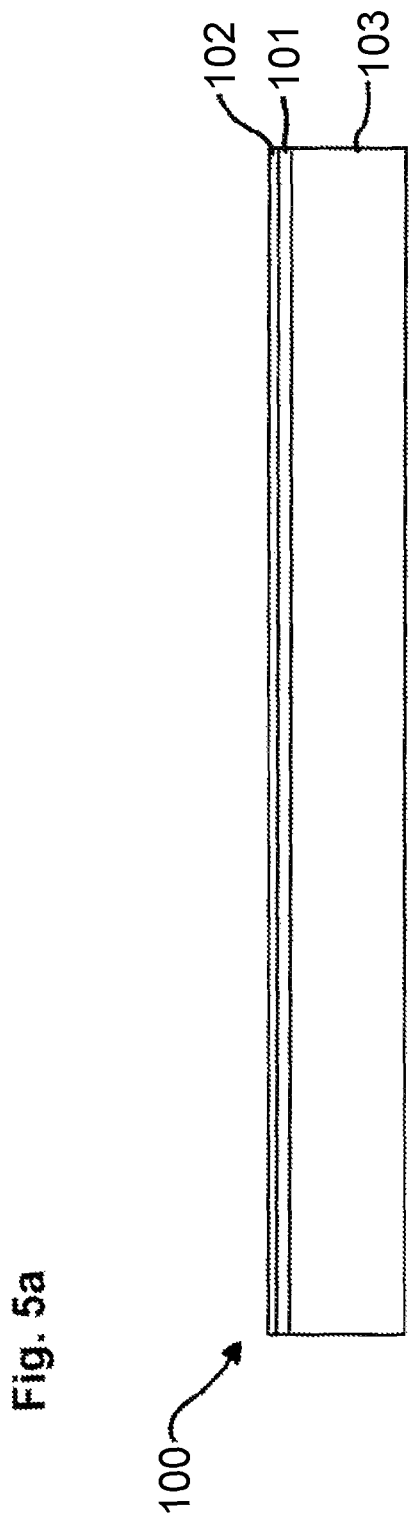

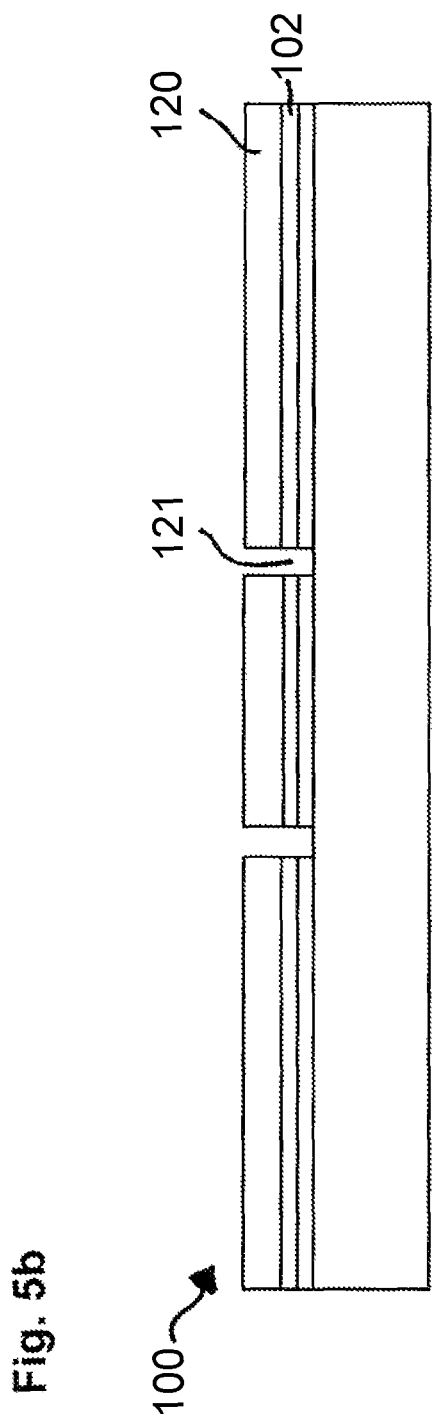

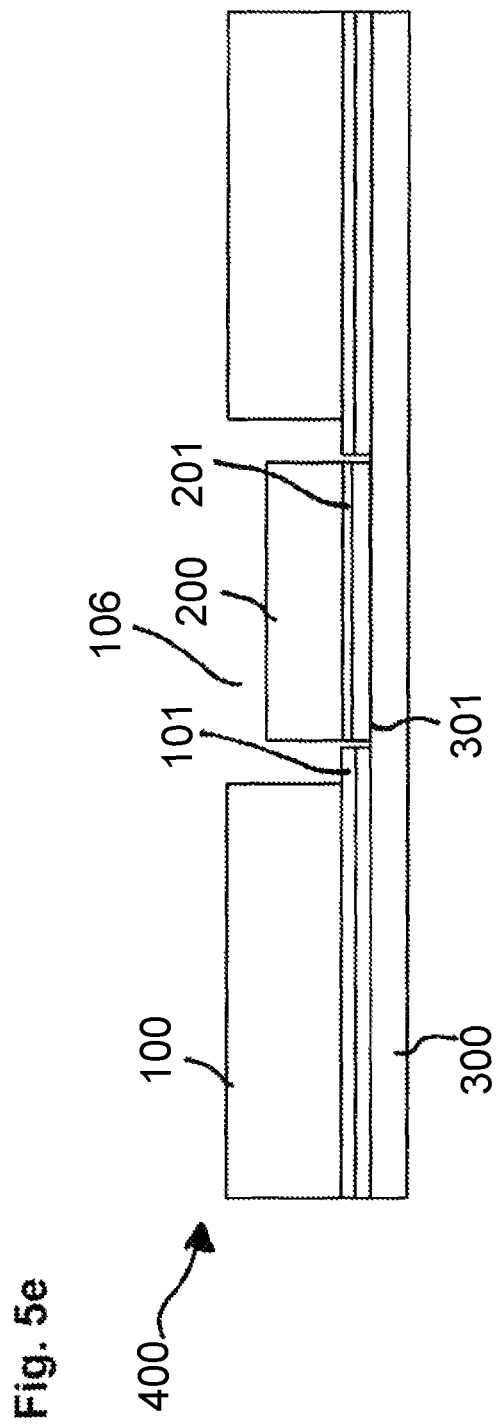

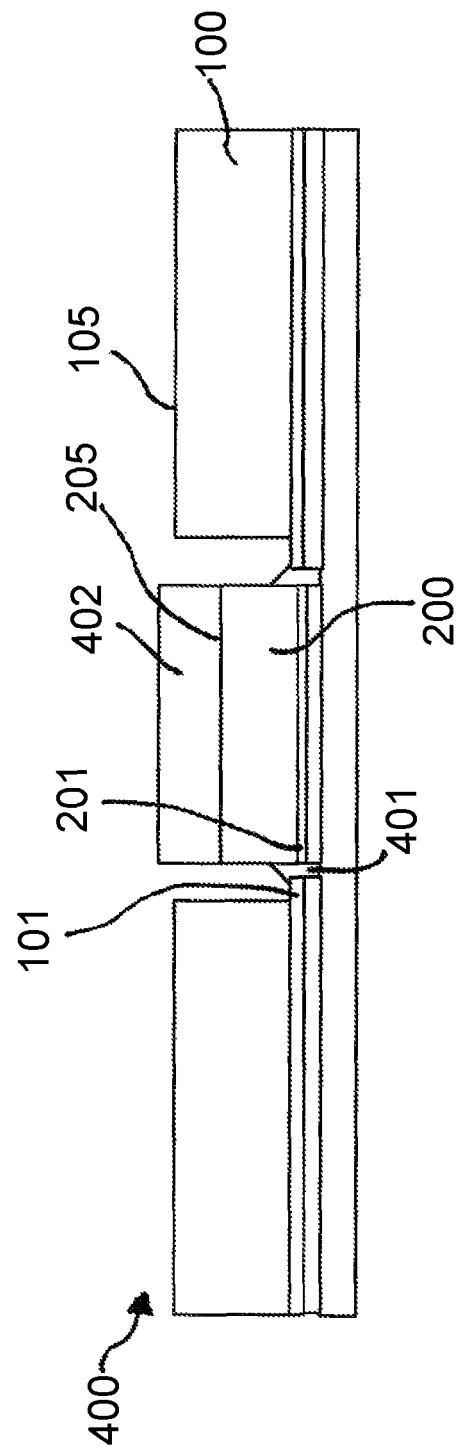

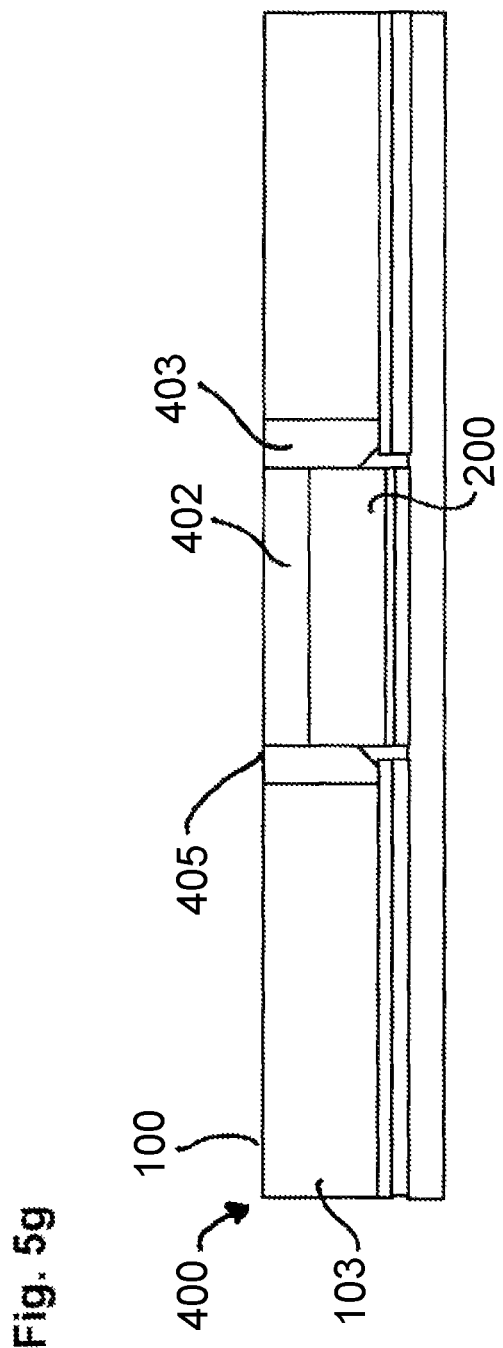

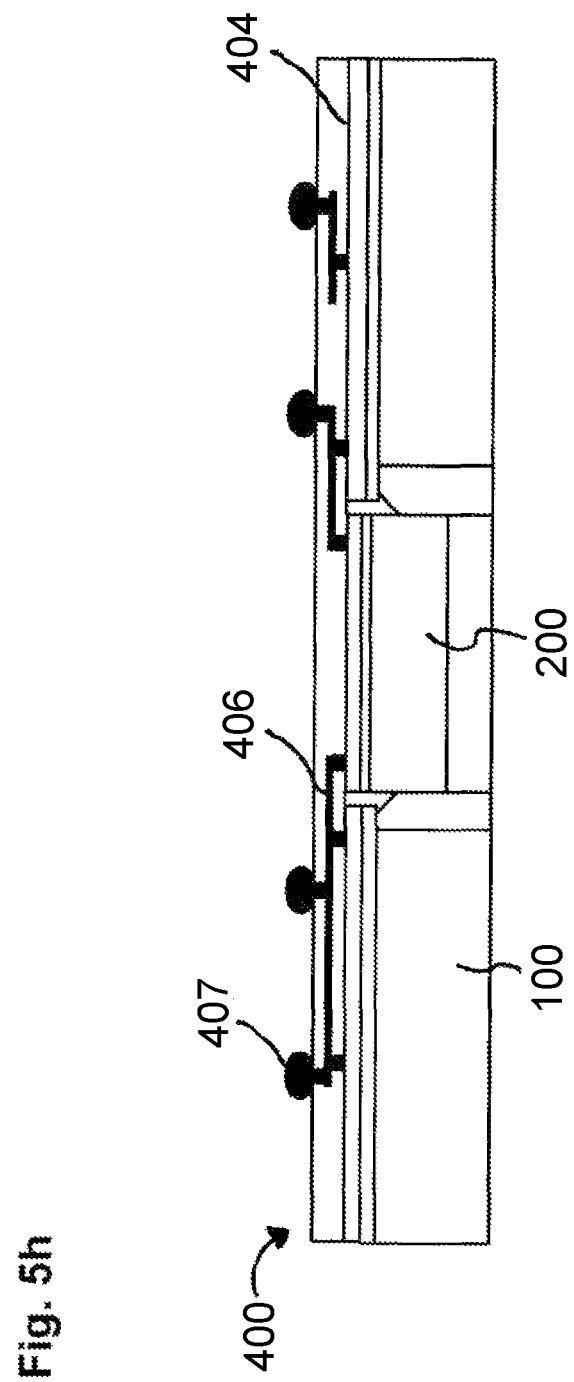

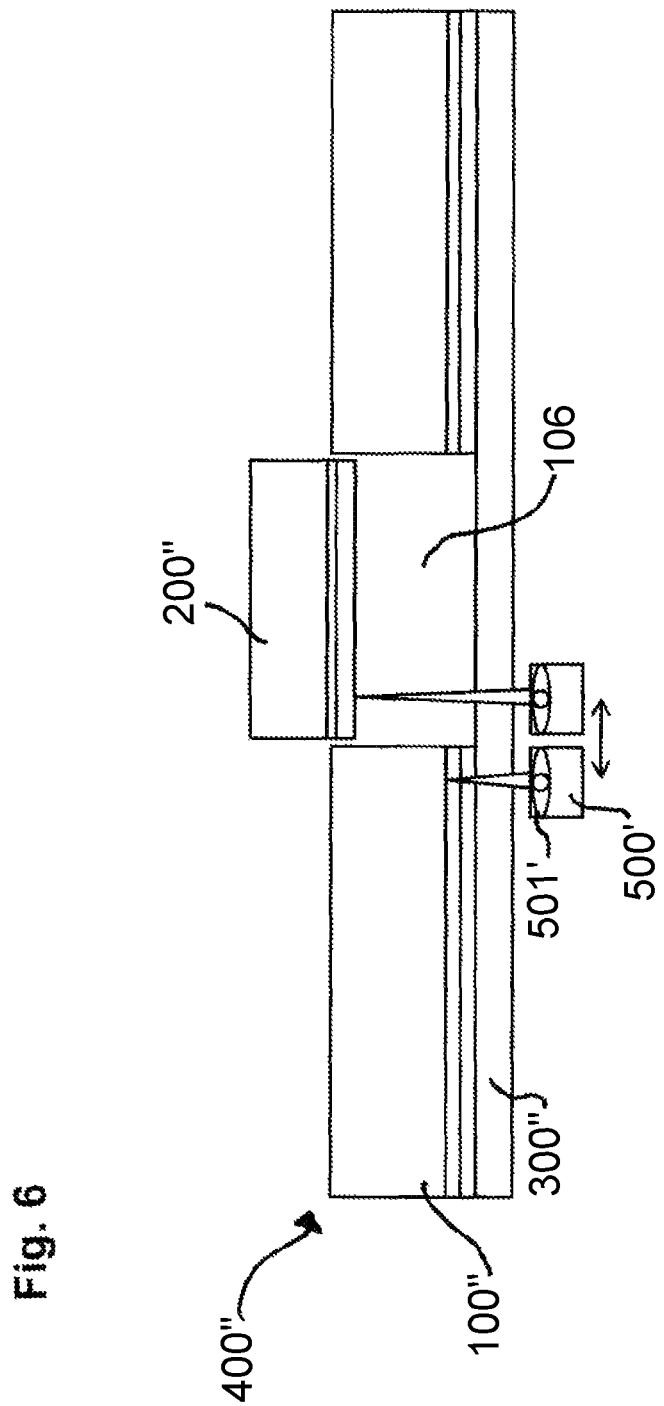

OPTICAL SYSTEM, OPTICAL COMPONENTS, AND METHOD FOR MANUFACTURING AN OPTICAL SYSTEM

CLAIM FOR PRIORITY

This application claims the benefit of priority of German Application Serial No. 10 2019 210 747.8, filed Jul. 19, 2019, which is hereby incorporated by reference in its entirety.

TECHNICAL FIELD

This disclosure relates to an optical system, an optical component and a method for manufacturing an optical system.

BACKGROUND

Optical elements such as lasers, modulators, photodiodes, and other elements, are increasingly miniaturized, interconnected to create new functions, and integrated. This allows for the realization of compact optical systems on suitable substrates, for instance as a photonic integrated circuit (or "PIC"). Such systems allow, for instance, for the implementation of splitters, couplers, phase shifters, ring resonators, arrayed waveguide gratings, optical amplifiers, switches, and other functional units. Light is transmitted by waveguides, which may be embedded into optical components formed, for instance, out of flat substrates, or be applied onto them.

SUMMARY/OVERVIEW

When manufacturing respective optical systems, it may be advantageous to provide an optical component with a recess or a cavity, into which a second optical component is subsequently inserted. A respective optical system and a respective method of manufacturing are known from publication DE 10 2016 203 453 A1.

When manufacturing optical systems of this type, the problem that must always be solved is that waveguides of different components must be optically coupled with each other, that is, to be aligned with each other so precisely that light from one waveguide can be transmitted into another waveguide with a degree of efficiency that suffices for any possible applications.

Often, in such optical systems, edge-emitting optical components are used, in other words, components in which the light spreading out in the waveguide leaves the component from an end face, meaning that it can be coupled into a waveguide through an end face of the component. For the optical coupling of such components, the respective end faces are arranged and mutually aligned in a suitable position and orientation, which is also known as butt coupling.

The requirements with respect to the precision of the alignment are higher when the dimensions of the waveguides that are to be coupled are smaller. Thus, a single mode waveguide that allows for the spreading of only one single light mode may have a diameter of just a few hundred nanometers or a few microns, such that correspondingly narrow tolerances are specified for the optical coupling.

For the precise alignment of edge-emitting optical components in butt coupling, different methods have been proposed.

In so-called active methods, a light signal that is transmitted and can be measured upon the generation of the optical coupling is maximized by the positioning of the components relative to each other. Such methods are complicated, however, and accordingly expensive and only suitable in specific situations. Furthermore, they stand in the way of further miniaturization.

Passive methods dispense with the measurement of light signal transmitted by the coupling and for the necessary complex manufacturing instructions. For these, however, typically, extremely stringent manufacturing tolerances of the optical components must be observed (for instance when they are mutually aligned by means of reference contact surfaces), which, in turn, is complicated and expensive.

Furthermore, heterogenous integration methods have been proposed for the production of PICs, in which semiconductor materials are bonded onto complementary metal oxide semiconductor wafers, onto which the semiconductors are then processed, which, due to the lithographic structuring of components, allows for a high degree of accuracy. Due to process-related restrictions and small yields, such methods are only practicable for a few applications.

The task of the disclosure is therefore to propose an optical system with improvements in terms of the alignment of components, as a result of which the aforementioned drawbacks are prevented or reduced. In addition, an optical component and a method for manufacturing an optical system are to be proposed.

The task is solved according to the disclosure by means of an optical system according to claim 1, an optical component according to claim 9 and a method according to claim 10. Advantageous embodiments and further development of the disclosure follow with the features the subordinate claims.

The proposed optical system comprises:
- a first optical component, featuring a first waveguide as well as a recess, which passes at least partially through the first optical component from a front side to a back side opposite the front side,
- a second optical component, arranged in the recess of the first optical component and featuring a second waveguide that can be optically coupled with the first waveguide,
- and a carrier substrate, wherein the first and the second optical component are arranged respectively on the carrier substrate.
- The first optical component is envisioned to feature a first marking set with a defined position and/or orientation relative to the first waveguide, the second optical component is to feature a second marking set with a defined position and/or orientation relative to the second waveguide, and based on a relative position and/or orientation of the first and the second marking set, it will be possible to determine whether the first and the second optical components are mutually aligned in a reference plane parallel to a surface of the carrier substrate in such a manner that an optical coupling of the first and the second waveguide is made possible.

Each of the optical components as well as the carrier substrate has a front side and a back side opposite the front side. Additional side faces, which are perpendicular to the front and back sides, are referred to here as end faces. Directions that are parallel to the front side—and therefore also to the reference plane—are referred to as lateral directions, and directions that are perpendicular to them are referred to as normal directions.

Since the optical coupling as described is made possible due to the respective alignment of the optical components in lateral directions, the optical coupling is prepared. Each generation of the optical coupling comprises the facilitation of the optical coupling by way of an alignment in lateral directions and in a normal direction.

The optical system described has the advantage that due to the registration of the alignment of the optical components based on the relative position and/or the relative orientation of the first and the second marking set—preferably during the manufacturing of the optical system—an optical coupling of the first and the second waveguide is made possible with a high degree of accuracy in a comparatively easily implementable and cost-effective manner (specifically, by a correction of a relative position and/or an orientation of the first and the second optical components for generating or improving the optical coupling). In particular, the known advantages of passive alignment with a simultaneous relaxation of the manufacturing tolerances are accomplished.

The arrangement of one of the optical components in a recess of another optical component leads to advantages in terms of thermal properties of the optical system, high-frequency applications, and the scaling and costs of manufacturing. Reference is made to the previously mentioned publication DE 10 2016 203 453 A1.

A marking set in the meaning of the present application comprises one or multiple markings, wherein a marking is an element whose position and/or orientation can be registered by means of a suitable measuring device. This registration may be optical, for instance by means of a camera or another optical scanning or registration system (for instance of a laser scanning system with a raster scanner and a point, line, or surface detector) by way of a measuring device. Alternatively, registration may also be performed in another way, for instance by means of electric or magnetic or contact-based measurement. When registering the position and/or the orientation of a marking set, all markings, multiple markings, or only a single marking of the marking set may be registered in their entirety or in part.

Registration may include a processing of data measured by means of the measuring device by means of a processing unit. The marking sets of the optical system proposed here may be designed so as to allow for a mutual alignment of the optical components, which in turn includes a mutual alignment of the waveguides in order to obtain or improve or prepare the optical coupling of the waveguides. The mutual alignment of the optical components comprises a mutual alignment of the marking sets by means of adjusting a relative position and/or orientation of the optical components in such a manner that a predetermined relative position and/or orientation of the marking sets is created. The predetermined relative position and/or orientation of the marking sets follows from the defined position and/or the orientation of the marking sets relative to the respective waveguide in such a manner that by creating the predetermined relative position and/or orientation, the optical coupling of the waveguide is obtained or improved or prepared. For aspects of the alignment of the optical components, within a given marking, set all markings, multiple markings even just one marking of the marking set may have to be considered in its entirety or in part.

A marking set may therefore be used as a positioning aid for the alignment of two components. Accordingly, a marking set or a marking of a marking set can be an element that has no optical, electronic, mechanical and/or other function except for its use as a positioning aid. Alternatively, a marking set may also have additional functions.

A marking may, for instance, be a coating, an embedded element, or part of a component which in certain areas and in certain properties, such as optical properties, was modified relative to its environment. Alternatively, a marking may also be a component used and/or intended for other purposes, for instance a structural part of a component, for instance an edge, a corner, a surface or, indeed, a waveguide.

The optical components and/or the carrier substrate can be flat or two-dimensionally extended elements, which may, for instance take the form of chips or wafers or be made out of these. At least one of the optical components may comprise a semiconductor chip (such as a silicon chip), a photonic integrated circuit (PIC), a silicon-on-insulator chip, a ceramic chip, and/or a glass chip. The carrier substrate may further contain materials such as silicon or other semiconductor materials, ceramics, glass, or polymers, or consist of them. At least one of the waveguides may contain a polymer, a glass, an oxide (for instance $SiO2$), a nitride (for instance $Si3N4$ in $SiO2$), and/or silicon (for instance as Si on $SiO2$). The multiple embodiments and uses of such components, materials, and composition and the method for their production and processing therefore transfer to the proposed system, along with their advantages as they are known to the person skilled in the art.

The optical components may be edge-emitting; the first and the second waveguide may therefore be arranged in the respective optical component in such a manner that light can spread in the waveguides parallel to the front side of the respective optical component, and enter and into the waveguide and exit from it through a portion of an end face.

The end faces can be prepared by mechanical burnishing, by lithographically defined dry etching, or by breaking (possibly along a prior incision) along defined crystal surfaces. This allows for the realization of particularly advantageous properties for the coupling or decoupling through the end faces into or out of the waveguides.

At least one of the optical components may feature one or multiple additional waveguides in addition to the first and second waveguides. In addition to the waveguides, at least one of the optical components may also feature additional elements, for instance optical and/or electronic elements. At least one of the optical components may, for instance, be embodied as an electro-optical circuit.

The recess may, for instance, be etched into a piece, or created through the removal of the remaining core after the etching of surrounding trenches. The recess may pass through the first optical component in part or in its entirety, wherein in the latter case, optical and mechanical access to the interior of the recess is particularly good.

The first and/or second optical component may obviously feature one or multiple additional recesses. Accordingly, the system may also comprise at least one third optical component, which feature [sic] in turn at least one third waveguide optically coupled with the first and/or second waveguide and/or at least one third marking set with a defined position and/or orientation relative to the third waveguide, and which may be arranged on the carrier substrate in the additional recess or in one of the additional recesses. The third and first and/or second marking set can then be used to detect a relative position and/or a relative orientation of the first and the second waveguide in the reference plane.

As the first and the second marking sets are mutually aligned as described above, a mutual alignment of the first and the second waveguides is possible, with a maximum lateral deviation from a desired relative position, for instance of less than 5 µm, less than 2 µm, less than 1 µm, less than 500 nm, or less than 200 nm, and/or a maximum lateral angular deviation from a desired relative orientation, for instance of less than 15 mrad, less than 5 mrad, less than 2 mrad, or less than 1 mrad.

The first wave conductor may feature a first distance from the front side of the first optical component, the second waveguide (201) may feature a second distance from a front side (204) of the second optical component (200), the front sides of the first and the second optical component may be facing the carrier substrate, and the first and the second distance may be selected such that a relative position and/or a relative orientation of the first and the second optical component in a normal direction that is perpendicular to the reference plane is created in such a manner that it allows for the optical coupling of the first and the second waveguide.

This provides an alignment of the first and the second waveguide in the normal direction, which contributes to the optical coupling. This allows for the advantages of the passive alignment of the waveguides to take effect even in case of an alignment in the normal direction.

For instance, a maximum deviation from a desired relative position in the normal direction may be achieved of less than 2 µm, less than 1 µm, less than 500 nm, less than 200 nm, or less than 100 nm.

The first and/or second distance may be defined by the layers arranged on the front side of the first and/or of the second optical components. This makes it possible to achieve a high-precision and reproducible mutual alignment of the first and the second waveguide in the normal direction. Such layers may be applied by means of various methods onto the front side of the first and/or the second optical component, for instance by means of epitaxy (sometimes followed by metallizations or passivizations, for instance by means of oxide or nitride), plasma-enhanced chemical vapor deposition (PECVD), or other layer deposition methods.

The combination of suitable lateral and normal deviation tolerances may achieve a desired efficiency of the optical coupling, such that an attenuation of a light signal coupled into one of the waveguides relative to the intensity of a light signal decoupled from the other waveguide may, for instance, be of less than 6 dB, less than 3 dB, less than 2 dB, or less than 1 dB.

A distance between a first end face of the first optical component, into which opens an end of the first waveguide that is to be coupled with the second waveguide, on the one hand, and a second end face of the second optical component, into which opens an end of the second waveguide that is to be optically coupled with the first waveguide, may, for instance, be less than 2 µm, less than 1 µm, less than 500 nm, less than 200 nm, less than 100 nm, but it may also be more than 2 µm. The first and second end faces may also touch each other.

It may be provided that at least a portion of at least one of the marking sets is realized by a portion of one of the waveguides or contains it, and/or that at least a portion of at least one of the marking sets is an edge of one of the optical components, or contains it. This makes possible a particularly uncomplicated production of the optical components or of the optical system, respectively, without additional steps for producing the markings.

At least a portion of at least one of the marking sets may be applied onto one of the optical components by means of a lithographic method, embedded into it. In this manner, precise production and a particularly good visibility of the marking sets or of parts thereof can be achieved.

It may be provided that at least a portion of at least one of the marking sets and at least a portion of at least one of the waveguides are produced in a joint process step and/or by means of a joint mask by means of a lithographic method. This has the advantage that the position and/or the orientation of the marking sets or of their respective portions are defined with respect to the respective waveguide with high precision and a high degree of reproducibility.

The carrier substrate may be at least in part transparent and/or translucent for a specific wavelength range, for instance for visible light, ultra-violet light, and/or infrared light. The registration of the relative position and/or the relative orientation of the first and the second waveguide in the reference plane may then be done advantageously with the help of a camera unit, for instance, positioned close to the back side of the carrier substrate that is facing away from the optical components, and which is capable of recording images of the optical components with their marking sets or parts of the marking sets through the carrier substrate.

Alternatively, or in addition, it may be provided for at least a portion of the first optical component to be attenuated in such a manner that at least a portion of the first marking set can be registered, and in particular be observed and/or measured, from the back side of the first optical component.

For instance, the recess may have a greater diameter on the back side of the optical component than on the front side of the optical component. This can be achieved, for instance, in that the recess is etched from the back side of the first optical component with a back mask, from the front side of the first optical component with a front mask, wherein the back mask has a greater unprotected area than the front mask.

It is particularly advantageous for the attenuated potion to be arranged in the area of the edge or of a portion of the edge of the recess.

The attenuated potion in the area of the edge of the recess forms a step, in other words, an area, in which the recess has a smaller diameter as compared to another area of the recess. The step may be wider in proximity of the marking sets in order to allow for a better optical registration of the marking sets. The first marking set may be arranged at least in part on a side of the step facing the back side of the first optical component, such that it is directly visible from the back side, or it may be arranged at least in part within the step or on the side of it that faces the front side of the first optical component, such that it is visible from the back side of the first optical component through the attenuated potion of the first optical component.

The mutual alignment of the first and the second marking set may be accomplished optically by means of the attenuated potion or of the step in a particularly advantageous manner, wherein a camera unit is inserted between the first and the second component, while these are moved—during the manufacturing of the system—towards each other, but a sufficient distance between of the first and the second component is maintained. The camera unit may in particular feature two optical units and/or an optical part and/or two sensors, such that images can be recorded in two opposing directions, such that, for instance, the back side—being the side facing away from the carrier substrate—of the second component and the front side the second component can be imaged simultaneously. Due to the described attenuation, at least parts of the two marking sets are visible.

This method has the advantage of allowing the two marking sets to be imaged with a fixed focal plane, thus making possible a particularly high degree of positioning accuracy.

At least one the marking sets may feature at least one linear and/or cross-shaped and/or circular and/or elliptical and/or polygonal element and/or multiple parallel lines and/or a Venier structure.

Advantageously, these would be linear elements or combinations thereof (which therefore includes cross-shaped and polygonal elements or their sides, or Venier structures). Sets of multiple parallel linear elements can be deemed to be particularly advantageous. Linear elements of a marking set can be parallel to the respective waveguide at a fixed distance or at fixed distances, thus allowing for a particularly good mutual alignment of the waveguides.

The aforementioned advantages are especially noticeable in the frequently occurring situation in which a waveguide close to the end face of an optical component, and in particular at the entry or exit point of the waveguide, is not positioned perpendicular to the end face, but rather at an angle of more or less than 90°. This can prevent undesired back-reflections of light, for instance in laser cavities. In this situation, the exact position of the entry or exit point depends on how much material was removed during the burnishing or breaking of the end face (see above). If a linear element of a marking set runs parallel to the waveguide, the linear element is shortened in the same way as the waveguide, and the point at which the linear element intersects with the end face changes in the same way as the entry or exit point of the waveguide.

It is even possible to set a necessary offset of the optical components, which may, for instance, be dictated by the refractive indices of the respective waveguides and the distance of the respective end faces, by means of the layers and/or the orientation of the linear elements.

It may be provided for mutually facing end faces of the first and the second element to have a distance of less than 100 μm, less than 10 μm, less than 1 μm, or less than 100 nm, for instance, at the end of the procedure, in other words, in particular after the mutual alignment of the components and the arrangement of the two components on the carrier substrate.

It may be provided for the first and the second marking set to supplement each other in a defined manner and/or to interlock and/or to be mutually complementary, in order to facilitate an alignment. This may be provided, for instance, in the case of simple linear elements, or, for instance, in the case of Venier structures, which are known to allow a particularly exact determination of a positioning deviation. Parts of the first and the second marking set may, for instance, respectively provide the readout scale and the main scale of a Venier structure.

It might be provided for at least one of the marking sets to comprise multiple markings at a largest possible distance (in other words, as large as possible in accordance with the dimensions of the respective optical component and the arrangement of other elements on it). A greater distance between the elements makes possible a more precise determination of positioning deviations and/or deviations in the orientation of the optical components, relative to the desired position.

It may be provided for at least a portion of at least one of the marking sets to pass from an end face of the respective optical component to a different edge, and/or for at least one of the marking sets to comprise elements in the proximity of multiple end faces. This too improves, on the one hand, the accuracy at which positioning or orientation deviations are determined, whereas on the other hand, it allows for taking into account the development of a waveguide in the proximity of multiple end faces, especially when optical couplings are intended for multiple end faces.

Attention should also be given to the general considerations that each marking set must contain at least one respective identifiable point that is different from the other points for each independent degree of freedom (shift, tilt angle) that must be considered when mutually aligning the optical elements. In linear or other extended, that is: non-point, elements, this can already be provided by multiple defined points of such elements (such as end points).

At least a portion of at least one of the marking sets may be an edge of one of the optical components or contain it.

In particular in combination with an additional part of the same marking set, embodied as a linear element positioned in parallel to one of the waveguides, is it possible to accurately define a position relative to an exit point of the said waveguide, specifically as a point of intersection of the edge with the linear element.

A respective edge of at least one of the optical components can also be marked as a portion of a marking set, embodied as an extended plane element (for instance as a polygon, for instance a rectangle), and thus be made clearly visible.

The proposed optical component features a waveguide and a marking set with a defined position and/or orientation relative to the waveguide. It may furthermore feature a recess, which passes at least in part through the first optical component from a front side to a back side opposite the front side.

The optical component thus designed can be used advantageously for the manufacturing of the proposed optical system.

The proposed method for manufacturing an optical system comprises:
  the provision of a first optical component, featuring a first waveguide as well as a recess, which passes through the first optical component from a front side to a back side opposite the front side, a second optical component, featuring a second waveguide (201, and a carrier substrate,
  the arrangement of the first and the second optical component on the carrier substrate in such a manner that the second optical component is arranged in the recess the first optical component,
  the mutual alignment of the first and the second optical component in such a manner that an optical coupling of the first waveguide with the second waveguide is produced.
  The first optical component is envisioned to feature a first marking set with a defined position and/or orientation relative to the first waveguide, the second optical component is to feature a second marking set with a defined position and/or orientation relative to the second waveguide, and the mutual alignment of the first and the second optical component to comprise:
  a mutual alignment of the first and the second marking set in order to mutually align the first and the second waveguide in a reference plane that is parallel to the surface of the carrier substrate.

Such a mutual alignment of the first and the second optical component has the advantage that the method thus designed allows for an optical coupling with a high degree of accuracy in a comparatively easy to implement and cost-effective way. In particular, the known advantages of passive alignment are accomplished with a simultaneous relaxation of the manufacturing tolerances. All the other previously mentioned advantages of the proposed optical system are realized by this method as well.

The first optical component may already feature the recess at the beginning of the procedure, or it may be added only in the course of the procedure, for instance as described above.

When arranging the first and the second optical component on the carrier substrate, for instance, the first optical component can be arranged on the carrier substrate such that its front side faces the front side of the carrier substrate. The first optical component may at that time be arranged temporarily or permanently on the carrier substrate, for instance by means of an adhesive applied to the carrier substrate and/or to the first optical component.

The second optical component may then be moved towards the back side of the first optical component, such that the front side of the first optical component faces the front side of the carrier substrate as well, but such that a distance between the first and the second component remains, thus allowing for determining a relative position and/or an orientation of at least parts of the first and the second marking by means of a suitable measuring device. This may be done, for instance, by optical means, for instance registering images by means of at least one camera. A position and/or an orientation of the second optical component and/or the first optical component, including the carrier substrate, can be corrected based on the specific relative position and/or orientation, such that a mutual alignment of the first and the second waveguides is made possible, in particular in lateral directions.

After the correction, the determination of the relative position and/or the orientation of the optical components, as well as the correction of the position and/or the orientation of the first and/or the second component, can be repeated, if necessary iteratively, meaning multiple times, until a desired tolerance of the relative position and/or an orientation of the first and the second waveguide is reached or exceeded. The second optical component can be arranged on the carrier substrate without affecting the alignment and be temporarily or permanently attached to it, for instance by means of an adhesive applied onto the carrier substrate and/or to the second optical component.

Alternatively, when arranging the first and the second optical component on the carrier substrate, the second optical component may be arranged on the carrier substrate first, after which the process continues in all other respects as described above, but wherein the steps respectively pertaining to the first or the second optical component are switched or modified accordingly.

The first wave conductor may feature a first distance from the front side of the first optical component, the second waveguide may feature a second distance from a front side of the second optical component, when arranging the first and the second optical component on the carrier substrate, the front sides of the first and the second optical component may be facing the carrier substrate, and the mutual alignment of the first and the second optical component may comprise:

the adjustment of the first and the second distance in order to mutually align the first and the second waveguide in a normal direction perpendicular to the reference plane.

The adjustment of the first and the second distance may further comprise an application of layers onto the front side of the first and/or the second optical component, wherein, for instance, the aforementioned layer deposition methods such as epitaxy or PECVD may be used.

The optical system may optionally be further processed in a variety of ways that are common for the processing of respective systems. This might include, for instance, a removal of the carrier substrate and/or the filling of the remaining gap between the optical components with suitable filler material and/or the attenuation of surfaces and/or the application of electric contacts.

The method may be executed by means of typical systems and devices for producing electronic, optical, or electro-optical components and systems, for instance by means of a flip-chip bonder.

It should be pointed out that the mentioned steps and partial steps of the method do not have to be executed in a specific order, and that the order can be determined based on specific embodiments.

BRIEF DESCRIPTION OF THE FIGURES

Exemplary embodiments of the invention are explained below with FIG. 1 through FIG. 1 through FIG. 6. The figures show schematically, as follows.

FIG. 3 shows a top view of a portion of an optical system manufactured using the optical components shown in FIG. 1 and FIG. 2.

FIG. 4 shows top view a portion of an optical system according to a further example, FIG. 5a through FIG. 5h show cross sections of the optical components shown in FIG. 1 through FIG. 3 during various steps of a method for producing the optical system shown in FIG. 3.

FIG. 6 shows a cross section of optical components according to a further example in a procedural step according to an additional example.

DETAILED DESCRIPTION

Figure 1:
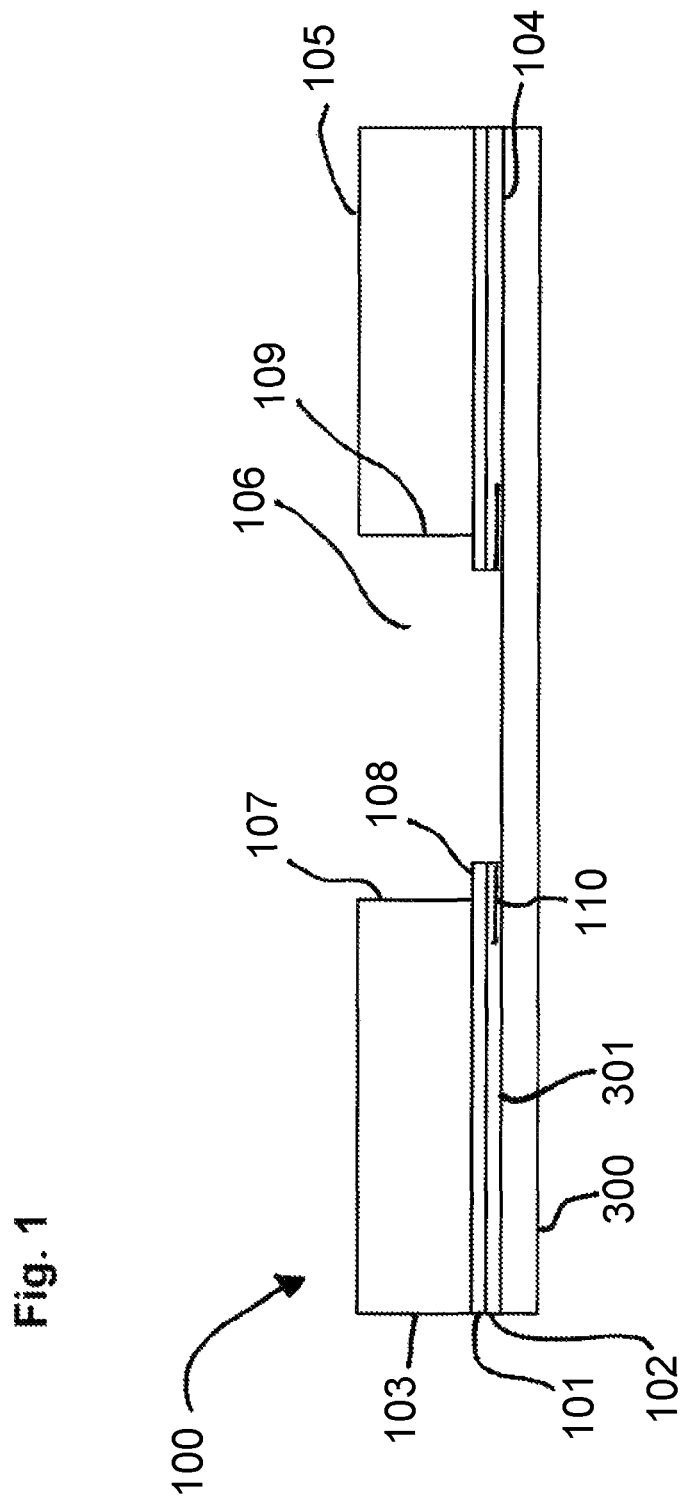
FIG. 1 shows a cross section of a first optical component attached onto a carrier substrate.

The first optical component 100 shown in cross section in FIG. 1 is executed as a photonic integrated circuit (PIC). The first optical component 100 features a first waveguide 101, which in the shown example is formed as a nitride waveguide (based on SiNx) in a SiO2 layer. The SiO2 layer 102 comprising the first waveguide 101 is arranged on a silicon layer 103. The first waveguide 101 may also be formed in a different way, for instance by way of lithographic structuring of a further silicon layer arranged on the SiO2 layer 102 (silicon-on-insulator architecture, SOI). Optionally, the first waveguide 101 may be additionally protected by a thin oxide passivization.

The SiO2 layer 102 is arranged on the front side 104 of the first optical component 100; the silicon layer 103 is arranged on the back side 105 of the first optical component 100. The first waveguide 101 opens out into end faces 109 of the first optical component 100, which are perpendicular to the front side 104. The first optical component 100 is in particular edge-emitting.

The first optical component 100 is attached by means of an adhesive layer 301 to a glass wafer serving as carrier substrate 300, but may alternatively also be attached to it in a different manner, for instance by means of a solder layer.

The first optical component 100 features a recess 106, which passes through the first optical component 100 from the front side 104 to the back side 105. The recess 106 may also pass through the first optical component 100 only partially. The first optical component 100 is attenuated at one edge 107 of the recess 106 in such a manner that the recess has a bigger diameter in the area of the silicon layer 103 than in the area of the waveguide 101 and of the SiO2 layer 102, such that a step 108 is formed. The step 108 is sufficient thin for the respective part of the first marking set 110 to be visible from the back side 105 of the first optical component 100. The recess 106 may also be executed without a step or attenuation, for instance such that it has identical cross sections everywhere along the normal direction.

Figure 2:
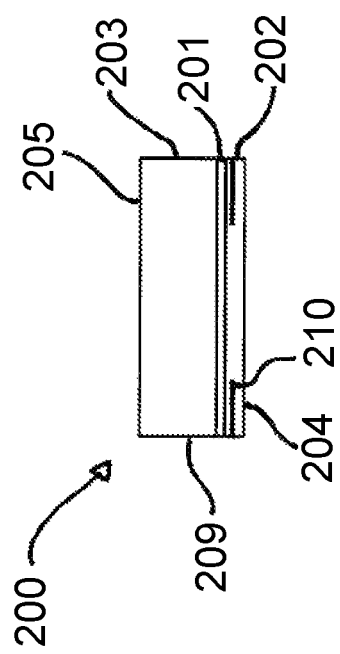
FIG. 2 shows a cross section of a second optical component.

The second optical component 200 in shown in cross section FIG. 2 features a second waveguide 201, arranged between a first substrate layer 202 and a second substrate layer 203, wherein the substrate layers 202 and 203 are realized in a III/V material system. The first substrate layer 202 is arranged on the front side 204 of the second optical component 200, and the second substrate layer 203 is arranged on the back side 205 of the second optical component 200. The second waveguide 201 opens out into end faces 209 of the second optical component 200, which are perpendicular to the front side 204. The second optical component 200 is in particular edge-emitting.

The second waveguide 201 can be optically coupled with the first waveguide 101. The end faces 209, at which the second waveguide 201 is to be optically coupled with the first waveguide 101, are prepared by mechanical burnishing or by lithographic structured dry etching. Alternatively, the end faces 209 may be prepared, for instance, by breaking along defined crystal surfaces.

The front layers 102 and 202 are prepared by way of deposition processes so as to result in precisely defined layer thicknesses.

The optical components 100 and 200 as well as the carrier substrate 300 can also be formed in a different manner or from different materials from what is exemplarily described above. For instance, at least one of the optical components 100 and 200 may comprise a semiconductor chip (such as a silicon chip), a photonic integrated circuit (PIC), a silicon-on-insulator chip, a ceramic chip, and/or a glass chip. The carrier substrate 300 may further contain materials such as silicon or other semiconductor materials, ceramics, glass, or polymers, or consist of them. At least one of the waveguides 101 and 201 may contain a polymer, a glass, an oxide (for instance SiO101), a nitride (for instance Si201N4 in SiO2), and/or silicon (for instance as Si on SiO2).

The optical system 400 shown in FIG. 3 in top view comprises the first optical component 100 with the recess 106, the second optical component 200 arranged in the recess 106, and the carrier substrate 300 (not shown here), wherein the first and the second optical component 100 and 200 are respectively arranged on the carrier substrate 300 attached by means of the adhesive layer 301. The first optical component 100 features a first marking set 110, which consists of lines that run parallel to the first waveguide 101, that is, of linear elements, and which therefore has a specific position and orientation relative to the first waveguide 101. The second optical component 200 features a second marking set 210, which consists of lines that run parallel to the second waveguide 201, and which therefore has a specific position and orientation relative to the second waveguide 201. Thus, based on a relative position and/or orientation of the first and the second marking set (110, 210), it will be possible to determine whether the first and the second optical component 100 and 200 are mutually aligned in a reference plane parallel to the front sides 104 and 204 and therefore also to a surface of the carrier substrate 300 in such a manner that an optical coupling of the first and the second waveguide 101 and 201 is possible.

The marking sets 110 and 210 are produced with the respective waveguides 101 and 201 in a joint process step and by means of a joint mask in a lithographic method, and are therefore embedded in the optical components 100 and 200. The marking sets 110 and 210 can also be formed in alternative manners. For instance, they may comprise metal elements that are applied to the front sides 104 and 204 of the optical components 100 and 200. The waveguides 101 and 202 themselves, to the extent that they are clearly visible, can also serve as marking sets or as parts of marking sets.

The marking sets 110 and 210 form parts of a Venier structure. The edges formed by the optical components 100 and 200 at the end faces 109 and 209 in the area of the marking sets 110 and 210 can be considered part of the marking sets as well, since together with the linear elements of the Venier structures they form defined intersection points.

In the area of the first marking set 110, the step 108 is wider than other parts of the edge 107.

The optical system 400' shown in top view in FIG. 4 comprises a first optical component 100' with a first waveguide 101 and a recess 106, as well as a second optical component 200' with a second waveguide 201. Contrary to the marking sets 110 and 210 of the optical components 100 and 200, the marking sets 110' and 210' of the optical components 100' and 200' are respectively formed by two linear alignment marks (111, 112; 211, 212) that run parallel to the waveguide 101 and 201. The alignment mark pairs 111/112 and 211/212 respectively have a distance that is maximized with respect to the dimensions of the second optical component 200'.

The marking sets 110/210 or 110'/210' may obviously also be constructed differently. For instance, at least one of them may feature at least one cross-shaped and/or circular and/or elliptical and/or polygonal element.

In what follows, additional aspects of the optical system 400, the optical components 100 and 200, and exemplary steps of the method for the manufacturing the optical system 400 will be described based on FIG. 5a through FIG. 6. The method comprises the provision of the first optical component 100, the second optical component 200, and the carrier substrate 300, the arranging of the first and the second optical component 100 and 200 on the carrier substrate 300 in such a manner that the second optical component 200 is arranged in the recess 106 of the first optical component 100, and the mutual alignment of the first and the second optical components 100 and 200 in such a manner that an optical coupling of the first waveguide 101 with the second waveguide 201 is made possible. For these purposes, the first and the second marking set 110 and 210 are mutually aligned in the reference plane.

In FIG. 5a through FIG. 6, the side of the respective component that is shown in an upward orientation is the same side that also faces upward in the respective procedural step, in other words, faces away from a workpiece carrier of a processing device that is used with the method. If the component is turned between successive processing steps, this is pointed out separately.

The processing device may, for instance, be a typical bonder for flat substrates, in particular semiconductor components.

FIG. 5a shows the optical component 100 in a partially processed form with the first waveguide 101, the SiO2 layer 102, and the silicon layer 103, wherein the SiO2 layer 102 is accessible for processing.

FIG. 5b shows the first optical component 100, after a front mask 120 was applied to the SiO2 layer in additional steps, and front trenches 121 were etched into the SiO2 layer 102 with the first waveguide 101.

Figure 5C:
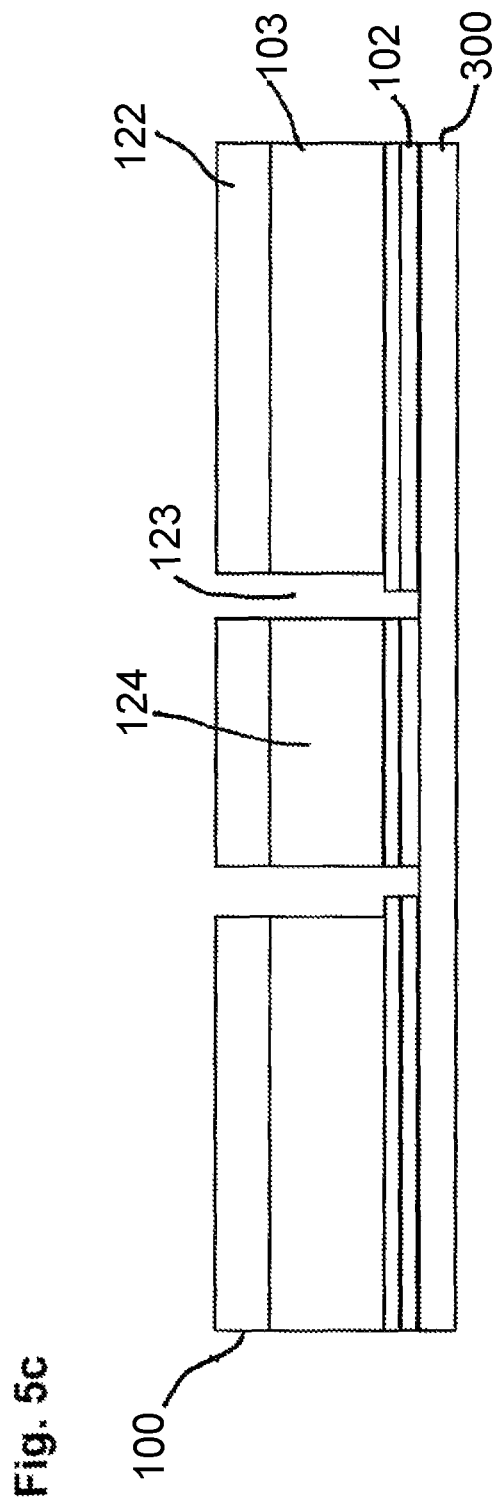

Next, the first optical component 100 is turned and arranged and attached onto the carrier substrate 300, as shown in FIG. 5c. After the application of a back mask 122 to the silicon layer 103, back trenches 123 are etched into the silicon layer 103, such that a core 124 is left behind. After the removal of the core 124, the first optical component has the form shown in FIG. 1, which has thus become available for the remaining procedural steps.

Figure 5D:
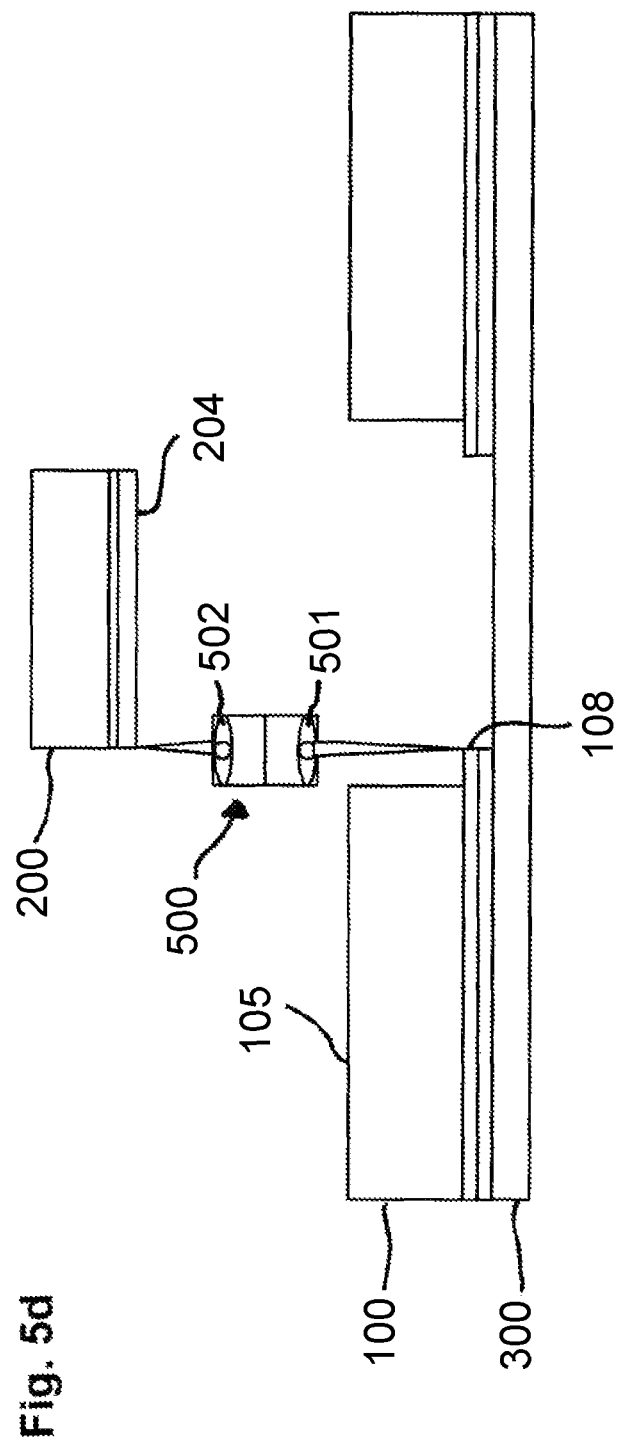

As shown in FIG. 5d, the second optical component 200, of which the front side 204 faces the back side 105 of the first optical component 100, is now moved into the proximity of the first optical component 200.

A camera unit 500 with two optical units 501 and 502, arranged on opposite sides of the camera unit 500, makes it possible to simultaneously image a portion of the step 108 of the first optical component 100 and a portion of the front side 204 of the second optical component 200, wherein respective portions of the marking sets 110 and 210 (not visible in this cross section) are registered.

The optical components 100 and 200 are now mutually aligned in that the position and the orientation of the second optical component 200 is corrected, such that the marking sets 110 and 210 are mutually aligned in the desired way. This can be controlled by repeated registration of the marking sets 110 and 210 by means of the camera unit 500.

While keeping the desired relative orientation and lateral position, the second optical component 200 is now arranged on the carrier substrate 300 in the recess 106 of the first optical component 100 and attached to the carrier substrate 300 by means of the adhesive layer 301.

By means of the precisely defined layer thicknesses of the front layers 102 and 202, a first distance is established between the front side 104 of the first optical component 100 and the first waveguide 101, and a second distance is established between the second optical component 204 and the second waveguide 201, such that the desired relative position and orientation of the first and the second optical component 100 and 200 is set in the normal direction, such that the waveguide 101 and 201 are mutually aligned in the normal direction so as to allow their optical coupling.

Since as a result, the waveguides 101 and 201 are mutually aligned precisely in lateral as well as in normal terms, an optical coupling of the waveguides 101 and 201 is generated.

FIG. 5f through FIG. 5h show additional optional procedural steps by way of which the optical system 400 can be further processed.

Initially, as shown in FIG. 5f, any remaining gaps between the waveguides 101 and 201 are filled with an optical filler material 401, wherein the optical filler material 401 has properties that are beneficial to optical coupling (such as wave length transmission, refractive index, dispersion function, etc.).

Furthermore, a sacrificial structure 402 is arranged on the back side 205 of the second optical component 200, to the extent that it is returned into the normal direction relative to the back side 105 of the first optical component 205.

Next—see FIG. 5g—the remaining gap between the optical components 100 and 200 are filled with a casting mass 403, and the (hardened) casting mass 403, the second silicon layer 103, and the sacrificial structure 402 are attenuated by grinding into a joint back side 405.

After the turning of the optical system 400 and the removal of the carrier substrate 300, the optical components 100 and 200 can be brought into an electric contact with the now exposed front side 404 my means of thin-film multilayer wiring 406, as shown in FIG. 5h, and be provided with bumps (contact elements) 407.

The number, type, and order of the steps of the method can obviously be adjusted, as a person skilled in the art will immediately understand, (in particular in view of the respective optical system that is to be manufactured, or of the properties of the optical components used).

FIG. 6 shows as possible alternative to the procedural step shown in FIG. 5d. In the first optical component 100" shown here, which is meant to be part of the optical system 400" in addition to the second component 200", the formation of a step in the margin of the recess 106 is dispensed with. By using an optically transparent carrier substrate 300", it is possible to form the optical components for aligning by means of the camera unit 500', which has only one optical system 501', by means of the carrier substrate 300". The camera unit 500' is brought into various sequential positions (indicates by the arrow), such that each time, a different focal plane must be set.

LIST OF REFERENCE NUMBERS 100, 100', 100" First optical component
101 First waveguide
102 SiO2 layer
103 Silicon layer
104 Front side
105 Back side
106 Recess
107 Edge
108 Step
109 End face
110, 110' First marking set
111 First alignment mark
112 Second alignment mark
120 Front mask
121 Front trenches
122 Back mask
123 Back trenches
124 Core
200, 200', 200" Second optical component
201 Second waveguide
202 First substrate layer
203 Second substrate layer
204 Front side
205 Back side
209 End face
210, 210' Second marking set
211 First alignment mark
212 Second alignment mark
300, 300" Carrier substrate
301 Adhesive layer
400, 400', 400" Optical system
401 Optical filler material
402 Sacrificial structure
403 Casting mass
404 Front side
405 Back side
406 Thin-film multilayer wiring
407 Bumps 500, 500' Camera unit
501, 501' First optical system
502 Second optical system

What is claimed is:

1. An optical system, comprising:
a first optical component, including a first waveguide and a recess, the recess passing at least partially through the first optical component from a front side to a back side opposite the front side, the first waveguide disposed within a layer arranged at or near the front side of the first optical component;
a second optical component, arranged in the recess of the first optical component and featuring a second waveguide that can be optically coupled with the first waveguide, the second waveguide disposed within a layer arranged at or near a front side of the second optical component; and
a carrier substrate, wherein the first and the second optical component are respectively arranged on the carrier substrate with the front side of the first optical component and the front side of the second optical component facing towards the carrier substrate, respectively;
wherein the first optical component includes a first marking set with at least one of a defined position or orientation relative to the first waveguide, wherein the second optical component features a second marking set with at least one of a defined position or orientation relative to the second waveguide, and wherein based on at least one of a relative position or orientation of the first marking set and on at least one of a relative position or orientation of the second marking set, a determination of whether the first and the second optical component are mutually aligned in a reference plane that is parallel to a surface of the carrier substrate such that an optical coupling between the first and the second waveguide is made.

2. The optical system according to claim 1, wherein the first waveguide features a first distance from the front side of the first optical component, wherein the second waveguide features a second distance from a front side of the second optical component, wherein the front side of the first optical component and the front side of the second optical component are facing the carrier substrate, and wherein the first distance and the second distance are selected such that at least one of a relative position or relative orientation of the first optical component and the second optical component in a normal direction that is perpendicular to the reference plane in such a manner that the optical coupling between the first waveguide and the second waveguide is possible.

3. The optical system according to claim 2, wherein at least one of the first distance or the second distance is determined by a layer arranged on the front side of at least one of the first optical component or second optical component.

4. The optical system according to claim 1, wherein at least a portion of at least one of the first marking set or the second marking set is formed by a portion of at least one of the first waveguide or the second waveguide or contains at least one of the first waveguide or the second waveguide, wherein at least a portion of at least one of the first marking set or the second marking set is an edge of one of at least one of the first optical component or the second optical component or contains at least one of the first optical component or the second optical component, and wherein at least a portion of at least of one of the first marking set or the second marking set is applied onto at least one of the first optical component or the second optical component by at least one of a lithographic method, or is embedded in at least one of the first optical component or the second optical component.

5. The optical system according to claim 1, wherein at least a portion of at least one of the first marking set or the second marking set and at least a portion of at least one of the first waveguide or the second waveguide are produced in at least one of a joint process step or by a joint mask using a lithographic method.

6. The optical system according to claim 1, wherein at least a portion of the first optical component is attenuated in such a manner that at least a portion of the first marking set of the back side can be registered by the first optical component.

7. The optical system according to claim 1, wherein at least one the first marking set or the second marking set includes at least one of linear, cross-shaped, circular, elliptical, or polygonal elements, or at least two parallel lines or a Vernier structure.

8. The optical system according to claim 1, wherein at least one of the first optical component or the second optical component includes at least one of a semiconductor chip, a photonic integrated circuit, a silicon-on-insulator chip, a ceramic chip, or a glass chip.

9. The optical system according to claim 1, wherein the carrier substrate is removable from at least one of the first optical component or the second optical component.

10. The optical system according to claim 1, wherein a surface of at least one of the first optical component or the second optical component is attenuated into a joint back side.

11. A method for manufacturing an optical system, comprising:
provisioning a first optical component, including a first waveguide and a recess, the recesses passing through the first optical component from a front side to a back side opposite the front side, the first waveguide disposed within a layer arranged at the front side of the first optical component;
provisioning a second optical component, including a front side and a back side opposite the front side and including a second waveguide, the second waveguide disposed within a layer arranged at a front side of the second optical component;
provisioning a carrier substrate;
arranging the first optical component and the second optical component on the carrier substrate with the front side of the first optical component and the front side of the second optical component facing towards the carrier substrate, respectively, so that the second optical component is arranged in the recess of the first optical component; and
aligning the first optical component and the second optical component in such a manner that an optical coupling of the first waveguide with the second waveguide is generated;
wherein the first optical component includes a first marking set with at least one of a defined position or orientation relative to the first waveguide, wherein the second optical component includes a second marking set with at least one of a defined position or orientation relative to the second waveguide, and wherein based on at least one of a relative position or orientation of the first marking set and on at least one of a relative position or orientation of the second marking set, alignment of the first optical component and the second optical component comprises:

a mutual alignment of the first marking set and the second marking set in order to mutually align the first waveguide and the second waveguide in a reference plane that is parallel to a surface of the carrier substrate.

12. The method according to claim 11, wherein the first waveguide features a first distance from the front side of the first optical component, the second waveguide features a second distance from a front side of the second optical component, wherein, when arranging the first optical component and the second optical component on the carrier substrate, the front side of the first optical component and the front side of the of second optical component are facing the carrier substrate, and wherein the alignment of the first optical component and the second optical component comprises:

adjustment of the first distance and the second distance to mutually align the first waveguide and the second waveguide in a normal direction perpendicular to the reference plane.

13. The method according to claim 11, further comprising:

removing the carrier substrate from at least one of the first or the second optical component;

filling a gap between the first optical component and the second optical component with a filler material;

applying a sacrificial structure to the back side of the second optical component facing away from the carrier substrate;

attenuating a surface of the first optical component and the second optical component into a joint back side; and applying an electric contact to a front side of the optical system exposed by the removing of the carrier substrate.

14. The optical system according to claim 1, wherein at least one of the first waveguide or the second waveguide contains at least one of a polymer, a glass, an oxide, a nitride, or silicon.

15. The optical system according to claim 1, wherein a gap between the first optical component and the second optical component is filled with a filler material.

16. The optical system according to claim 1, wherein a sacrificial structure is arranged on a back side of the second optical component that faces away from the carrier substrate.

* * * * *